(12) United States Patent
Nagoh et al.

(10) Patent No.: US 7,763,693 B2
(45) Date of Patent: Jul. 27, 2010

(54) CURABLE COMPOSITION

(75) Inventors: Hironobu Nagoh, Shunan (JP); Junji Momoda, Shunan (JP); Katsuhiro Mori, Shunan (JP)

(73) Assignee: Tokuyama Corporation, Shunan-shi (JP)

( * ) Notice: Subject to any disclaimer, the term of this patent is extended or adjusted under 35 U.S.C. 154(b) by 986 days.

(21) Appl. No.: 10/567,790

(22) PCT Filed: Aug. 11, 2004

(86) PCT No.: PCT/JP2004/011802
§ 371 (c)(1),
(2), (4) Date: Feb. 9, 2006

(87) PCT Pub. No.: WO2005/014717
PCT Pub. Date: Feb. 17, 2005

(65) Prior Publication Data
US 2006/0264593 A1 Nov. 23, 2006

(30) Foreign Application Priority Data
Aug. 12, 2003 (JP) .............................. 2003-207389

(51) Int. Cl.
C08F 118/02 (2006.01)
C08F 20/10 (2006.01)
C08F 130/08 (2006.01)
C08G 63/48 (2006.01)

(52) U.S. Cl. .................. 526/319; 525/330.3; 525/7.2; 525/326.5; 522/77; 522/170; 522/172

(58) Field of Classification Search ................ 526/319; 525/303.3, 7.2, 326.5; 522/75, 172, 170, 522/78, 77; 252/586
See application file for complete search history.

(56) References Cited

U.S. PATENT DOCUMENTS

| 4,556,605 | A | 12/1985 | Mogami et al. |
| 2003/0036579 | A1* | 2/2003 | Momoda et al. ............... 522/75 |
| 2004/0109133 | A1* | 6/2004 | Kadowaki .................... 351/163 |
| 2004/0220292 | A1 | 11/2004 | Momoda et al. |
| 2005/0263745 | A1* | 12/2005 | Momoda et al. ............ 252/586 |

FOREIGN PATENT DOCUMENTS

| JP | 5-34649 A | 2/1993 |
| JP | 2002-341297 A | 11/2002 |
| JP | 2003-128713 A | 5/2003 |
| JP | 2003128713 A * | 5/2003 |
| WO | WO 9938924 A1 * | 8/1999 |
| WO | WO-01/02449 A2 | 1/2001 |
| WO | WO 0105854 A1 * | 1/2001 |
| WO | WO-03/011967 A1 | 2/2003 |

* cited by examiner

Primary Examiner—David Wu
Assistant Examiner—Michael M Bernshteyn
(74) Attorney, Agent, or Firm—Birch, Stewart, Kolasch & Birch, LLP

(57) ABSTRACT

A curable composition comprising (1) 0.1 to 20 parts by weight of a silicon compound having a silanol group or a functional group for forming a silanol group upon hydrolysis and no radically polymerizable group, such as γ-glycidoxypropyltrimethoxysilane, (2) 100 parts by weight of radically polymerizable monomers and (3) 0.01 to 20 parts by weight of a photochromic compound, wherein
the radically polymerizable monomers include a radically polymerizable monomer having an epoxy group in the molecule, such as glycidyl methacrylate.

This curable composition is capable of forming a photochromic coating layer which shows excellent photochromic properties such as high color development density and fast fading rate, is free from the dissolution of the photochromic compound, exhibits high adhesion to a substrate through a simple pre-treatment and has excellent hard coating applicability.

5 Claims, No Drawings

CURABLE COMPOSITION

FIELD OF THE INVENTION

The present invention relates to a curable composition which is useful for the manufacture of an optical article having photochromism such as a photochromic spectacle lens.

DESCRIPTION OF THE PRIOR ART

Photochromic spectacles function as sunglasses outdoors where their lenses darken swiftly upon exposure to light including ultraviolet radiation such as sunlight and as normal transparent spectacles indoors where their lenses recover transparency without exposure. Demand for the above photochromic spectacles is growing.

Photochromic spectacle lenses made of plastics are popular because they are light in weight and safe. In general, photochromism is provided to the plastic lenses by compounding an organic photochromic compound. As means of compounding the photochromic compound, there are known a method in which the surface of a lens having no photochromism is impregnated with a photochromic compound (to be referred to as "impregnation method" hereinafter) and a method in which a photochromic compound is dissolved in a monomer and the resulting mixture is polymerized to obtain a photochromic lens directly (to be referred to as "inmass method" hereinafter).

Besides these methods, there is also known a method in which a coating containing a photochromic compound (to be also referred to as "photochromic coating" hereinafter) is applied to the surface of a plastic lens to form a coating layer having photochromism (photochromic coating layer) (to be referred to as "coating method" hereinafter). However, it is not easy to achieve photochromism required for photochromic spectacle lenses with a thin photochromic coating layer alone. Most of the photochromic lenses which have been implemented so far are manufactured by the impregnation or inmass method.

However, a photochromic coating which can meet the above requirement has recently been developed and can provide the excellent characteristic feature of the coating method, that is, photochromism to any type of lens substrate theoretically. Accordingly, expectations of the coating method are growing rapidly. For example, a soft substrate that enables a photochromic compound to easily diffuse in must be used as a substrate lens in the impregnation method and a special monomer composition must be used to develop excellent photochromism in the inmass method whereas there are no such restrictions on the substrate in the coating method.

As the photochromic coating which can be suitably used in the coating method, there is known a composition which comprises a "photochromic compound" such as a chromene compound, "amine compound", and "polymerizable monomers including a radically polymerizable monomer having a silanol group or a group for forming a silanol group upon hydrolysis and/or a radically polymerizable monomer having an isocyanate group" (refer to the pamphlet of WO03/011967).

The above photochromic coating gives a photochromic coating layer having high adhesion to a substrate and excellent photochromic properties. However, to obtain sufficiently high adhesion to a substrate from the coating, the substrate must be subjected to a troublesome pre-treatment such as plasma treatment. Especially when a substrate which is hardly etched is used, the curing temperature or pre-treatment condition must be very strict.

SUMMARY OF THE INVENTION

It is therefore an object of the present invention to provide a curable composition capable of forming a photochromic coating layer which shows excellent photochromic properties such as high color development density and fast fading rate, is free from the dissolution of a photochromic compound, exhibits high adhesion to a substrate through a simple pre-treatment and has excellent hard coating applicability.

It is another object of the present invention to provide a coating which comprises the above curable composition.

It is still another object of the present invention to provide a photochromic optical article having a cured layer of the above curable composition.

It is a further object of the present inventing to provide a photochromic cured product which is a cured product of the above curable composition.

Other objects and advantages of the present invention will become apparent from the following description.

The present invention has been proposed to attain the above objects and accomplished based on the finding that the above objects can be attained by a curable composition prepared by mixing a specific amount of a silicon compound having a silanol group or a functional group for forming a silanol group upon hydrolysis and no radically polymerizable group (to be referred to as "silyl compound" hereinafter) and radically polymerizable monomers including a radically polymerizable monomer having at least one epoxy group in the molecule (to be simply referred to as "epoxy-based monomer" hereinafter) with a photochromic compound.

That is, firstly, the above objects and advantages of the present invention are attained by a curable composition which comprises (1) 0.1 to 20 parts by weight of a silicon compound having a silanol group or a functional group capable of forming a silanol group upon hydrolysis and no radically polymerizable group, (2) 100 parts by weight of a radically polymerizable monomer and (3) 0.01 to 20 parts by weight of a photochromic compound, wherein the radically polymerizable monomer includes a radically polymerizable monomer having an epoxy group in the molecule.

Secondly, the above objects and advantages of the present invention are attained by a coating comprising the above curable composition.

Thirdly, the above objects and advantages of the present invention are attained by an optical article having photochromism which comprises a cured layer of the curable composition of the present invention formed on at least one side of an optical substrate.

In the fourth place, the above objects and advantages of the present invention are attained by a photochromic cured product obtained by curing the above curable composition.

The photochromic coating disclosed by the pamphlet of WO03/011967 contains "a radically polymerizable monomer having a silanol group or a group for forming a silanol group upon hydrolysis and/or a radically polymerizable monomer having an isocyanate group" as an adhesive component which is taken into the interior of a cured product at the time of curing because it has a polymerizable group. In contrast to this, as the curable composition of the present invention comprises a silicon compound having no radically polymerizable group as an adhesive component, its effective use ratio becomes high and the above silicon compound is immobilized by the epoxy group contained in the polymerizable monomer component. Because of this, when the curable composition of the present invention is used, high adhesive force (bonding force) to a substrate can be obtained simply by subjecting the substrate to a simple pre-treatment such as rinsing with a basic aqueous solution.

DETAILED DESCRIPTION OF THE PREFERRED EMBODIMENT

In the present invention, to obtain high adhesion between a curable composition after curing and the substrate of a spectacle lens, (1) a silicon compound (silyl compound) having a silanol group or a functional group for forming a silanol group upon hydrolysis and no radically polymerizable group is used. Adhesion between a photochromic cured product obtained by curing the curable composition of the present invention and the substrate is improved and further adhesion to a hard coat cured by a condensation method is greatly improved when this silyl compound is contained.

Any known silyl compound may be used as the silyl compound if it has a silanol group ($\equiv$Si—OH) or a group for forming a silanol group upon hydrolysis and no radically polymerizable group.

Illustrative examples of the group for forming a silanol group upon hydrolysis include alkoxysilyl groups ($\equiv$Si—O—R; R is an alkyl group), aryloxysilyl groups ($\equiv$Si—O—Ar; Ar is an aryl group which may be substituted), halosilyl groups ($\equiv$Si—X; X is a halogen atom) and silyloxysilyl group (disiloxane bond; $\equiv$Si—O—Si$\equiv$).

From the viewpoints of ease of forming a silanol group, synthesis ease, preservation ease and little influence upon the physical properties of a cured product of a group eliminated from a silicon atom by a reaction, out of the groups for forming a silanol group upon hydrolysis, alkoxysilyl groups and silyloxysilyl group are preferred, alkoxysilyl groups containing an alkoxyl group having 1 to 4 carbon atoms are more preferred, and methoxysilyl group and ethoxysilyl group are the most preferred.

The silyl compound of the present invention does not contain a (meth)acryloyl group and derivatives of a (meth)acryloyl group such as (meth)acryloyloxy group, (meth)acryloylamino group and (meth)acryloylthio group, and radically polymerizable groups such as vinyl group, allyl group and styryl group.

Examples of the silyl compound which can be suitably used in the present invention are compounds represented by the following formulas (1) to (5).

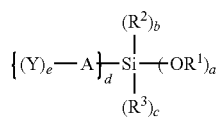

wherein $R^1$ is an alkyl group or aryl group, $R^2$ and $R^3$ are each independently an alkyl group, aryl group, acyl group or halogen atom, A is a bivalent to tetravalent organic residue, Y is a halogen atom such as fluorine atom, chlorine atom or bromine atom, hydroxyl group, amino group, mercapto group, cyano group, epoxy group, isocyanate group, ureido group or glycidyl group, "a" is an integer of 1 to 3, "b" is an integer of 0 to 2, "c" is an integer of 0 to 2, "d" is an integer of 1 to 3, and "e" is an integer of 1 to 3, with the proviso that a+b+c+d=4.

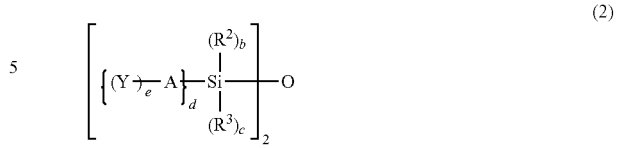

wherein $R^2$, $R^3$, A, Y, "b", "c", "d" and "e" areas defined in the above formula (1), with the proviso that b+c+d=3.

wherein $R^4$ is an alkyl group, aryl group, acyl group or halogen atom, and $R^1$ to $R^3$, "a", "b", "c" and "d" are as defined in the above formula (1).

wherein $R^1$, $R^2$, $R^3$, A, "a", "b" and "c" are as defined in the above formula (1), with the proviso that a+b+c=3, and z is an integer of 2 to 4.

wherein $R^5$ is an alkyl group or aryl group, $R^6$ and $R^7$ are each independently an alkyl group, aryl group, acyl group or chloro atom, "b" is an integer of 0 to 2, "c" is an integer of 0 to 2, and "d" is an integer of 1 to 3, with the proviso that b+c+d=3.

In the above formulas (1), (3) and (4), $R^1$ is an alkyl group or aryl group. It is preferably an alkyl group having 1 to 10 carbon atoms in the main chain or aryl group having 6 to 10 ring forming carbon atoms from the viewpoints of ease of forming a silanol group upon hydrolysis and preservation stability. The alkyl group or aryl group may have a substituent which is selected from an alkyl group having 1 to 10 carbon atoms such as methyl group, ethyl group or propyl group (excluding the case where $R^1$ is an alkyl group), haloalkyl group having 1 to 10 carbon atoms such as chloromethyl group or trifluoromethyl group (excluding the case where $R^1$ is an alkyl group), alkoxyl group having 1 to 10 carbon atoms such as methoxy group, ethoxy group or butoxy group, acyl group having 2 to 10 carbon atoms such as acetyl group, propionyl group, oleyl group or benzoyl group, amino group, substituted amino group having 1 to 10 carbon atoms such as methylamino group, ethylamino group, dimethylamino group or diethylamino group, halogen atom such as fluorine atom, chlorine atom or bromine atom, hydroxyl group, carboxyl group, mercapto group, cyano group and nitro group.

Examples of the substituted or nonsubstituted alkyl group having 1 to 10 carbon atoms in the main chain include methyl group, ethyl group, propyl group, butyl group and chloromethyl group, and examples of the substituted or nonsubstituted aryl group having 6 to 10 ring forming carbon atoms include phenyl group, toluyl group and xylyl group.

From the viewpoints of ease of forming a silanol group upon hydrolysis and preservation stability, $R^1$ is preferably an alkyl group, more preferably an alkyl group having 1 to 4 carbon atoms, the most preferably methyl group or ethyl group.

In the above formulas (1) to (4), $R^2$, $R^3$ and $R^4$ are each independently an alkyl group, aryl group, acyl group or halogen atom. Examples of the alkyl group and aryl group are the same as those listed for $R^1$ and preferred groups are the same as $R^1$. The acyl group is preferably an acyl group having 2 to 10 carbon atoms. The acyl group may be an aliphatic acyl group or aromatic acyl group. Specific examples of the acyl group include acetyl group, propionyl group and benzoyl group. Examples of the halogen atom include fluorine atom, chlorine atom and bromine atom.

In the above formulas (1), (2) and (4), A is a bivalent to tetravalent organic residue, preferably a bivalent to tetravalent organic residue having 1 to 30 carbon atoms (when a group having a carbon atom is bonded, the carbon atom of the group is counted as one of the carbon atoms of the organic residue). The organic residue is not limited to a particular structure and may have a side chain or substituent. It may have a bond other than carbon-carbon bond, such as an ether bond, ester bond, amido bond, imino bond, amino bond, urethane bond, thioether bond or sulfonyl bond in the structure and further may contain an oxa group (ketone carbon). Examples of the substituent of the organic residue include halogen atoms such as fluorine atom, chlorine atom and bromine atom, hydroxyl group, amino group, mercapto group, cyano group and nitro group.

The organic residue is preferably a group having 1 to 10 carbon atoms. Specific examples of the organic residue include an alkylene group having 1 to 10 carbon atoms such as methylene group, ethylene group, propylene group, trimethylene group or butylenes group, alkylenedioxy group having 1 to 10 carbon atoms such as methylenedioxy group, ethylenedioxy group, propylenedioxy group or butylenedioxy group, and groups shown below.

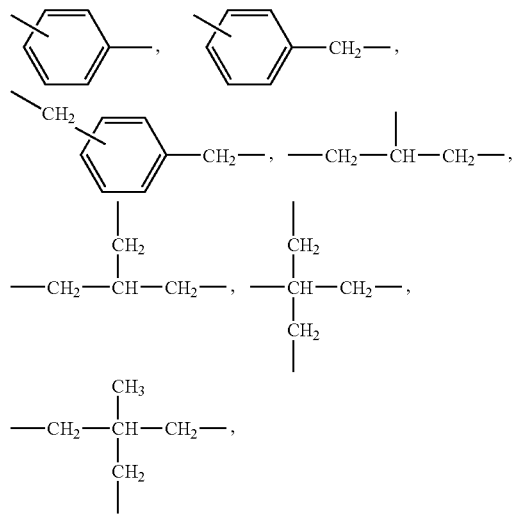

In the above formulas, n is an integer of 1 to 5, and n' and n" are each an integer of 1 to 3. These groups substituted by the above substituents are also included.

In the above formulas (1) and (2), Y is a halogen atom such as fluorine atom, chlorine atom or bromine atom, hydroxyl group, amino group, mercapto group, cyano group, epoxy group, isocyanate group, ureido group or glycidyl group. Out of these, from the viewpoint of reactivity with the epoxy-based monomer of the present invention, hydroxyl group, amino group, phenylamino group, mercapto group, cyano group, epoxy group, isocyanate group, ureido group and glycidyl group are preferred, and epoxy group and glycidyl group are the most preferred.

In the above formula (5), $R^5$ is an alkyl group or aryl group, and examples of $R^5$ are the same as those listed for $R^1$ and preferred groups are the same as $R^1$. In the above formula (5), $R^6$ and $R^7$ are each independently an alkyl group, aryl group, acyl group or chloro atom. Examples of the alkyl group, aryl group and acyl group are the same as those listed for $R^2$ and $R^3$ and preferred groups are the same as $R^2$ and $R^3$.

Out of the silyl compounds represented by the above formulas, silyl compounds represented by the formula (1) are preferred, out of which silyl compounds represented by the following formula (6) are particularly preferred.

$$Y'\text{-}A'\text{-}Si(OR^8)_3 \tag{6}$$

wherein $R^8$ is an alkyl group having 1 to 4 carbon atoms, A' is an alkylene group having 1 to 10 carbon atoms, and Y' is a hydroxyl group, amino group, mercapto group, epoxy group, isocyanate group, ureido group or glycidyl group.

In the above formula (6), A' is an alkylene group having 1 to 10 carbon atoms, preferably propylene group because it can be easily synthesized. $R^8$ is an alky group having 1 to 4 carbon atoms, preferably methyl group or ethyl group from the viewpoint of reactivity.

Specific examples of the silyl compounds represented by the above formula (1) to (5) include γ-aminopropyltriethoxysilane, γ-aminopropyltrimethoxysilane, γ-aminopropylmethyldiethoxysilane, γ-aminopropylmethyldimethoxysilane, γ-dibutylaminopropyltrimethoxysilane, γ-(2-aminoethyl)aminopropyltriethoxysilane, γ-(2-aminoethyl)aminopropyltrimethoxysilane, γ-(2-aminoethyl)aminopropylmethyldimethoxysilane, γ-phenylaminopropyltrimethoxysilane, γ-ureidopropyltriethoxysilane, β-(3,4-epoxycyclohexyl)ethyltrimethoxysilane, γ-glycidoxypropyltrimethoxysilane, γ-glycidoxypropylmethyldimethoxysilane, γ-glycidoxypropylmethyldiethoxysilane, γ-isocyanatopropyltriethoxysilane, γ-isocyanatopropyltrimethoxysilane, γ-mercaptopropyltrimethoxysilane, γ-mercaptopropyltriethoxysilane, γ-mercaptopropymethyldimethoxysilane, trimethylmethoxysilane, trimethylethoxysilane, dimethyldimethoxysilane, dimethyldiethoxysilane, methyltriethoxysilane, methyltrimethoxysilane, tetramethoxysilane, tetraethoxysilane, methyldimethoxysilane, methyldiethoxysilane, dimethylethoxysilane, isobutyltrimethoxysilane, n-hexyltriethoxysilane, n-hexyltrimethoxysilane, phenyltriethoxysilane, phenyltrimethoxysilane, diphenyldimethoxysilane, diphenyldiethoxysilane, dimethyldimethoxysilane, dimethyldiethoxysilane, cyclohexylmethyldimethoxysilane, trifluoropropyltrimethoxysilane, perfluorooctylethyltriethoxysilane, bis(trimethoxysilylpropyl)amine, 1,6-bis(trimethoxysilyl)hexane, bis(3-triethoxysilylpropyl)tetrasulfan, γ-chloropropyltrimethoxysilane, γ-chloropropylmethyldimethoxysilane, 1,3,5-N-tris(3-triethoxysilylpropyl)isocyanurate, methyltrichlorosilane, dimethyldichlorosilane, trimethylchlorosilane, dimethylbutylchlorosilane, dimethyloctadecylchlorosilane and phenylmethyldichlorosilane.

Out of these, silyl compounds represented by the above formula (6) such as γ-aminopropyltriethoxysilane, γ-aminopropylmethyldimethoxysilane, γ-glycidoxypropyltrimethoxysialne, γ-glycidoxypropylmethyldimethoxysilane and γ-glycidoxypropylmethyldiethoxysilane are particularly preferred.

These silyl compounds may be used alone or in combination of two or more. The amount of the silyl compound must be 0.1 to 20 parts by weight based on 100 parts by weight of the total of all the polymerizable monomer components (2). When the amount is smaller than 0.1 part by weight, adhesion between the coating layer and the substrate and adhesion between the coating layer and the hard coating layer become unsatisfactory and when the amount is larger than 20 parts by weight, color development density and fading rate which are photochromic properties deteriorate and also phase separation between the silyl compound and the radically polymerizable monomers which are other components of the present invention occurs, whereby the cured product is whitened to lose its transparency. From the viewpoint of its effect, the silyl compound is used in an amount of preferably 0.5 to 10 parts by weight, particularly preferably 1 to 10 parts by weight based on 100 parts by weight of the total of all the polymerizable monomer components.

The curable composition of the present invention comprises (2) radically polymerizable monomers in order to improve the characteristic properties of the obtained cured product such as solvent resistance after curing, hardness and heat resistance or photochromic properties such as color development density, fading rate and durability, in addition to the above silyl compound. The radically polymerizable monomers must include a radically polymerizable monomer having at least one epoxy group in the molecule (may be referred to as "epoxy-based monomer" hereinafter). When the epoxy-based monomer is used as one of the radically polymerizable monomers, the durability of the photochromic compound can be further improved and the adhesion of the photochromic coating layer is improved. Bonding to the silyl compound is caused by the epoxy-based monomer, thereby contributing to the homogeneity of the cured product.

Any known compound may be used as the epoxy-based monomer if it has at least one epoxy group and at least one radically polymerizable group in the molecule. Specific examples of the epoxy-based monomer which can be suitably used in the present invention include glycidyl acrylate, glycidyl methacrylate, β-methylglycidyl methacrylate, bisphenol A-monoglycidyl ether-methacrylate, 4-glycidyloxymethacrylate, 3-(glycidyl-2-oxyethoxy)-2-hydroxypropyl methacrylate, 3-(glycidyloxy-1-isopropyloxy)-2-hydroxypropyl acrylate, 3-glycidyloxy-2-hydroxypropyloxy)-2-hydroxypropyl acrylate and glycidyloxypolyethylene glycol methacrylate having an average molecular weight of 540. Out of these, glycidyl acrylate, glycidyl methacrylate and glycidyloxypolyethylene glycol methacrylate having an average molecular weight of 540 are particularly preferred.

The amount of the epoxy-based monomer is not particularly limited but preferably 0.01 to 30 wt %, particularly preferably 0.1 to 20 wt % of the total of all the radically polymerizable monomer components from the viewpoint of its effect.

Components other than the epoxy-based monomer out of the polymerizable monomer components are not particularly limited. However, with a view to improving the characteristic properties of the cured product such as solvent resistance after curing, hardness and heat resistance or photochromic properties such as color development density and fading rate, it is preferred to add a monomer having an L-scale Rockwell hardness of its homopolymer of 60 or more, specifically 65 to 130 (may also be referred to as "high-hardness monomer" hereinafter) and a monomer having an L-scale Rockwell hardness of its homopolymer of 40 or less (may also be referred to as "low-hardness monomer" hereinafter) and optionally a monomer having an L-scale Rockwell hardness of its homopolymer of more than 40 and less than 60 (may also be referred to as "medium-hardness monomer" hereinafter) or a radically polymerizable monomer having a silanol group or a group for forming a silanol group upon hydrolysis. The high-hardness monomer has the effect of improving the solvent resistance after curing, hardness and heat resistance of a cured product and the low-hardness monomer has the effects of making the cured product strong and improving the fading rate of the photochromic compound.

The term "L-scale Rockwell hardness" means hardness measured in accordance with JIS-B7726. It can be simply judged whether the above hardness condition is satisfied or not by measuring the homopolymer of each monomer. More specifically, as shown in Examples which will be given hereinafter, a monomer is homopolymerized to obtain a 2 mm-thick cured product which is then kept indoors at 25° C. for one day to measure its L-scale Rockwell hardness with a Rockwell hardness meter. The homopolymer used for the measurement of the above L-scale Rockwell hardness is obtained by cast homopolymerizing a monomer under the condition that 90% or more of the polymerizable groups of the monomer are homopolymerized. The L-scale Rockwell hardness of a cured product obtained by homopolymerization under the above condition is measured as almost a constant value.

The high-hardness monomer, low-hardness monomer, medium-hardness monomer and radically polymerizable monomer having a silanol group or a group for forming a silanol group upon hydrolysis which are used in the photochromic coating disclosed by the above WO03/011967 may be used as the above high-hardness monomer, low-hardness monomer, medium-hardness monomer and radically polymerizable monomer having a silanol group or a group for forming a silanol group upon hydrolysis, respectively.

Illustrative examples of the high-hardness monomer which can be suitably used in the present invention include trimethylolpropane trimethacrylate, trimethylolpropane triacrylate, tetramethylolmethane trimethacrylate, tetramethylolmethane triacrylate, trimethylolpropane trimethacrylate, tetramethylolmethane tetramethacrylate, tetramethylolmethane tetraacrylate, trimethylolpropane triethylene glycol trimethacrylate, trimethylolpropane triethylene glycol triacrylate, ethoxylated pentaerythritol tetraacrylate, ethoxylated pentaerythritol tetramethacrylate, pentaerythritol trimethacrylate, pentaerythritol tetramethacrylate, dipentaerythritol hexaacrylate, urethane oligomer tetraacrylate, urethane oligomer hexamethacrylate, urethane oligomer hexaacrylate, polyester oligomer hexaacrylate, caprolactone modified dipentaerythritol hexaacrylate, ditrimethylolpropane tetraacrylate, tetrafunctional polyester oligomer having a molecular weight of 2,500 to 3,500 (EB80 of Daicel UCB Co., Ltd., etc.), tetrafunctional polyester oligomer having a molecular weight of 6,000 to 8,000 (EB450 of Daicel UCB Co., Ltd., etc.), hexafunctional polyester oligomer having a molecular weight of 45,000 to 55,000 (EB1830 of Daicel UCB Co., Ltd., etc.), tetrafunctional polyester oligomer having a molecular weight of 10,000 (GX8488B of Dai-ichi Kogyo Seiyaku Co., Ltd., etc.), bisphenol A dimethacrylate, 2,2-bis(4-methacryloyloxyethoxyphenyl)propane, 2,2-bis(3,5-dibromo-4-methacryloyloxyethoxyphenyl)propane, ethylene glycol diacrylate, ethylene glycol dimethacrylate, 1,4-butylene glycol dimethacrylate, 1,9-nonylene glycol dimethacrylate, neopentylene glycol dimethacrylate, neopentylene glycol diacrylate, diethylene glycol dimethacrylate, triethylene glycol dimethacrylate, tetraethylene glycol dimethacrylate, tripropylene glycol dimethacrylate, tetrapropylene glycol dimethacrylate, bisphenol A diglycidyl methacrylate, ethylene glycol bisglycidyl methacrylate and glycidyl methacrylate.

Illustrative examples of the low-hardness monomer which can be suitably used in the present invention include alkylene glycol di(meth)acrylates such as trialkylene glycol diacrylate, tetraalkylene glycol diacrylate, nonylalkylene glycol diacrylate and nonylalkylene glycol dimethacrylate; polyalkylene glycol(meth)acrylates such as 2,2-bis(4-acryloyloxypolyethyelne glycol phenyl)propane having an average molecular weight of 776, 2,2-bis(4-methacryloyloxypolyethylene glycol phenyl)propane having an average molecular weight of 804, polyethylene glycol methacrylate having an average molecular weight of 526, polyethylene glycol methacrylate having an average molecular weight of 360, methyl ether polyethylene glycol methacrylate having an average molecular weight of 475, methyl ether polyethylene glycol methacrylate having an average molecular weight of 1,000, polypropylene glycol methacrylate having an average molecular weight of 375, polypropylene methacrylate having an average molecular weight of 430, polypropylene methacrylate having an average molecular weight of 622, methyl ether polypropylene glycol methacrylate having an average molecular weight of 620, polytetramethylene glycol methacrylate having an average molecular weight of 566, octylphenyl ether polyethylene glycol methacrylate having an average molecular weight of 2,034, nonyl ether polyethylene glycol methacrylate having an average molecular weight of 610, methyl ether polyethylene thioglycol methacrylate having an average molecular weight of 640, and perfluoroheptyl ethylene glycol methacrylate having an average molecular weight of 498; and stearyl methacrylate, lauryl methacrylate, ethylhexyl methacrylate, methyl acrylate, ethyl acrylate, butyl acrylate and lauryl acrylate.

Out of these low-hardness monomers, methyl ether polyethylene glycol methacrylate having an average molecular weight of 475, methyl ether polyethylene glycol methacrylate having an average molecular weight of 1,000, trialkylene glycol diacrylate, tetraalkylene glycol diacrylate, nonylalkylene glycol diacrylate, methyl acrylate, ethyl acrylate, butyl acrylate and lauryl acrylate are particularly preferred.

Illustrative examples of the medium-hardness monomer include bifunctional (meth)acrylates such as polytetramethylene glycol dimethacrylate having an average molecular weight of 650, polytetramethylene glycol dimethacrylate having an average molecular weight of 1,400 and bis(2-methacryloyloxyethylthioethyl)sulfide; polyallyl compounds such as diallyl phthalate, diallyl isophthalate, diallyl tartarate, diallyl epoxy succinate, diallyl fumarate, diallyl chlorendate, diallyl hexaphthalate and allyl diglycol carbonate; polythioacrylate and polythiomethacrylate compounds such as 1,2-bis(methacryloylthio)ethane, bis(2-acryloylthioethyl)ether and 1,4-bis(methacryloylthiomethyl)benzene; unsaturated carboxylic acids such as acrylic acid, methacrylic acid and maleic anhydride; acrylate and methacrylate compounds such as methyl methacrylate, butyl methacrylate, benzyl methacrylate, phenyl methacrylate, 2-hydroxyethyl methacrylate and biphenyl methacrylate; fumarate compounds such as diethyl fumarate and diphenyl fumarate; thioacrylate and thiomethacrylate compounds such as methyl thioacrylate, benzyl thioacrylate and benzyl thiomethacrylate; vinyl compounds such as styrene, chlorostyrene, methylstyrene, vinyl naphthalene, α-methylstyrene dimer, bromostyrene, divinylbenzene and vinylpyrrolidone; and radically polymerizable monofunctional monomers having 6 to 25 carbon atoms in the hydrocarbon chain having an unsaturated bond in the molecular like (meth)acrylate such as oleyl methacrylate, nerol methacrylate, geraniol methacrylate, linalool methacrylate and farnesol methacrylate.

Further, any known compound may be used as the radically polymerizable monomer (may also be referred to as "silyl monomer" hereinafter) if it has a silanol group or a group for forming a silanol group upon hydrolysis. Illustrative examples of the silanol group or the group for forming a silanol group upon hydrolysis are the same as the above silyl compound and examples of the radically polymerizable group include (meth)acryloyl group and derivatives of the (meth)acryloyl group such as (meth)acryloyloxy group, (meth)acryloylamino group and (meth)acryloylthio group, and known radically polymerizable groups such as vinyl group, allyl group and styryl group. When the radically polymerizable group is a vinyl group, allyl group or styryl group, it may have a substituent. Examples of the substituent include alkyl groups and haloalkyl groups having 1 to 4 carbon atoms such as methyl group, ethyl group, propyl group, butyl group, chloromethyl group and trifluoromethyl group, halogen atoms, cyano group, nitro group and hydroxyl group. When the radically polymerizable group is a (meth)acryloylamino group, an organic group such as substituted or nonsubstituted alkyl group, aryl group or allyl group may be bonded to the amidonitrogen atom of the group in addition to the (meth) acryloyl group and the above silanol group or a group for forming a silanol group upon hydrolysis.

Out of these radically polymerizable groups, (meth)acryloyl group and (meth)acryloyloxy group are preferred, and (meth)acryloyloxy group is more preferred from the viewpoints of easy acquisition and high polymerizability.

Out of the silyl monomers, silyl monomers represented by the following formula (7) are particularly preferred.

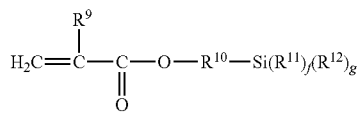

(7)

wherein $R^9$ is a hydrogen atom or methyl group, $R^{10}$ is an alkylene group having 1 to 10 carbon atoms, $R^{11}$ is an alkoxyl group having 1 to 4 carbon atoms, $R^{12}$ is an alkyl group having 1 to 4 carbon atoms, "f" is an integer of 1 to 3, and "g" is an integer of 0 to 2, with the proviso that f+g=3.

In the above formula (7), $R^9$ is a hydrogen atom or methyl group, $R^{10}$ is an alkylene group having 1 to 10 carbon atoms. Examples of the alkylene group having 1 to 10 carbon atoms in the main chain include ethylene group, propylene group, trimethylene group and butylenes group. $R^{11}$ is an alkoxyl group having 1 to 4 carbon atoms which is methoxy group, ethoxy group, propoxy group or butoxy group. $R^{12}$ is an alkyl group having 1 to 4 carbon atoms which is methyl group, ethyl group, propyl group or butyl group.

Specific examples of the silyl monomer include γ-methacryloyloxypropyltrimethoxysilane, γ-methacryloyloxypropyltriethoxysilane, γ-methacryloyloxypropylmethyldimethoxysilane, (3-acryloxypropyl)dimethylmethoxysilane, (3-acryloxypropyl)methyldimethoxysilane, (3-acryloxypropyl)trimethoxysilane, 3-(N-allylamino)propyltrimethoxysilane, allyldimethoxysilane, allyltriethoxysilane, allyltrimethoxysilane, 3-aminophenoxydimethylvinylsilane, 4-aminophenoxydimethylvinylsilane, 3-(3-aminopropoxy)-3,3-dimethyl-1-propenyltrimethoxysilane, butenyltriethoxysilane, 2-(chloromethyl)allyltrimethoxysilane, diethoxyvinylsilane, 1,3-divinyltetraethoxydisiloxane, docosenyltriethoxysilane, o-(methacryloxyethyl)-N-(triethoxysilylpropyl)urethane, N-(3-methacryloxy-2-hydroxypropyl)-3-aminopropyltriethoxysilane, methacryloxyethoxytrimethylsilane, (methacryloxymethyl)dimethylethoxysilane, methacryloxymethyltriethoxysilane, methacryloxymethyltrimethoxysilane, methacryloxypropyldimethylethoxysilane, methacryloxypropyldimethylmethoxysilane, methacryloxypropyltris(methoxyethoxy)silane, 7-octenyltrimethoxysilane, 1,3-bis(methacryloxy)-2-trimethylsiloxypropane, tetrakis(2-methacryloxyethoxy)silane, trivinylethoxysilane, trivinylmethoxysilane, vinyldimethylethoxysilane, vinyldiphenylethoxysilane, vinylmethyldiacetoxysilane, vinylmethyldiethoxysilane, vinylmethyldimethoxysilane, o-(vinyloxyethyl)-N-(triethoxysilylpropyl)urethane, vinyloxytrimethylsilane, vinylphenyldiethoxysilane, vinylphenylmethylmethoxysilane, vinyltriacetoxysilane, vinyltri-t-butoxysilane, vinyltriethoxysilane, vinyl triisopropenoxysilane, vinyltriisopropoxysilane, vinyltrimethoxysilane, vinyltriphenoxysilane and vinyltris(2-methoxyethoxy)silane.

Out of these, silyl monomers represented by the above formula (7) such as γ-methacryloyloxypropyltrimethoxysilane, γ-methacryloyloxypropyltriethoxysilane, γ-methacryloyloxypropylmethyldimethoxysilane, (3-acryloxypropyl)dimethylmethoxysilane, (3-acryloxypropyl)methyldimethoxysilane, (3-acryloxypropyl)trimethoxysilane, (methacryloxymethyl)dimethylethoxysilane, methacryloxymethyltriethoxysilane, methacryloxymethyltrimethoxysilane, methacryloxypropyldimethylethoxysilane and methacryloxypropyldimethylmethoxysilane are particularly preferred. The silyl monomers can be well copolymerized with a radically polymerizable monomer other than the silyl monomer of the present invention and is effective as an aid for further improving the strength and adhesion of the cured product of the present invention.

The above high-hardness monomer, low-hardness monomer, medium-hardness monomer and radically polymerizable monomer having a silanol group or a group for forming a silanol group upon hydrolysis can be suitably mixed together before use. To achieve good balance between the characteristic properties of a cured product of the curable composition such as solvent resistance, hardness and heat resistance and photochromic properties such as color development density and fading rate, preferably, the low-hardness monomer is used in an amount of 5 to 70 wt % and the high-hardness monomer is used in an amount of 5 to 95 wt % of the total of all the radically polymerizable monomers. The medium-hardness monomer is preferably used in an amount of 0 to 30 wt % of the total of the epoxy monomer, low-hardness monomer and high-hardness monomer. The radically polymerizable monomer having a silanol group or a group for forming a silanol group upon hydrolysis is used in an amount of 0 to 20 wt %, preferably 0.5 to 10 wt %, more preferably 1 to 10 wt % based on the same standard as the medium-hardness monomer. Particularly preferably, a monomer having three or more radically polymerizable groups is used as the high-hardness monomer in an amount of 5 wt % or more. In the above composition, the epoxy-based monomer and the radically polymerizable monomer having a silanol group or a group for forming a silanol group upon hydrolysis are classified into high-hardness monomer, low-hardness monomer or medium-hardness monomer according to the Rockwell hardness of their homopolymers and contained in these components.

A known photochromic compound may be used as the photochromic compound used in the curable composition of the present invention. For example, photochromic compounds such as fulgimide compounds, spirooxazine compounds and chromene compounds are well known and may be used in the present invention without restriction. For example, the same photochromic compound as used in the photochromic coating disclosed by the above pamphlet of WO03/011967 may be used. Examples of the photochromic compound which can be suitably used in the present invention include chromene compounds having the following structures.

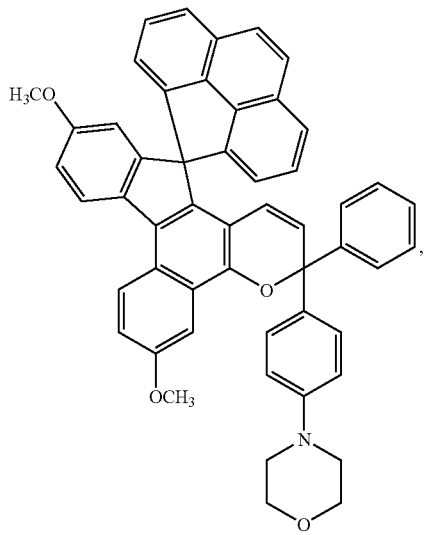

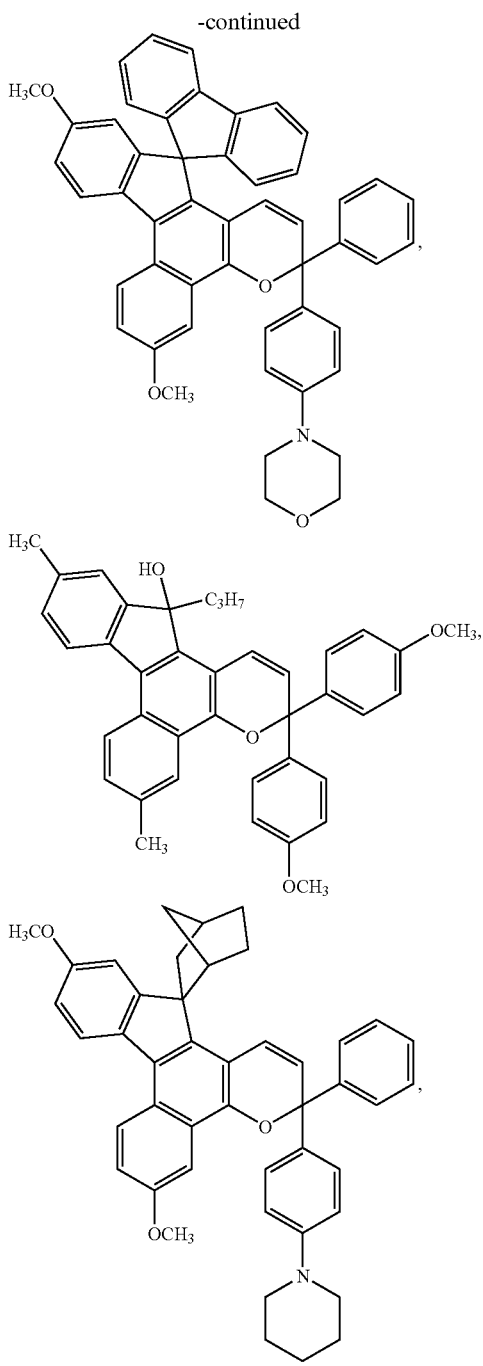

These photochromic compounds (the above chromene compounds and other photochromic compounds) may be used in combination of two or more to develop a suitable color.

In the curable composition of the present invention, the amount of the photochromic compound is 0.01 to 20 parts by weight based on 100 parts by weight of the total of all the radically polymerizable monomers. When the amount of the photochromic compound is smaller than 0.01 part by weight, the color development density may lower and when the amount is larger than 20 parts by weight, the photochromic compound does not dissolve in the polymerizable monomers fully and therefore becomes nonuniform with the result that the color development density may become nonuniform. From the viewpoint of its effect, the photochromic compound is used in an amount of 0.05 to 15 parts by weight, specifically 0.1 to 10 parts by weight based on 100 parts by weight of the total of all the radically polymerizable monomers. When the curable composition of the present invention is used to coat an optical material which will be described hereinafter, suitable color development density can be obtained by increasing the amount of the photochromic compound if the coating layer is thin and by reducing the amount of the photochromic compound if the coating layer is thick. More specifically, when the thickness of the coating layer is about 10 μm, the photochromic compound is preferably used in an amount of 5 to 15 parts by weight based on 100 parts by weight of the total of all the radically polymerizable monomers and when the thickness of the coating layer is about 50 μm, it is preferably used in an amount of 0.1 to 5 parts by weight.

A curing catalyst for the silyl compound is suitably contained in the curable composition of the present invention in addition to the above radically polymerizable monomers. Any known curing catalyst may be used if it can cure the silyl compound. Examples of the curing catalyst include perchlorates such as zinc perchlorate, aluminum perchlorate, magnesium perchlorate and ammonium perchlorate, metal acetyl acetonatos such as aluminum acetylacetylacetonato, indium acetylacetylacetonato, chromium acetylacetylacetonato, nickel acetylacetylacetonato, titanium acetylacetylacetonato, cobalt acetylacetylacetonato and copper acetylacetylacetonato, organic metal salts such as sodium nitrate, zinc naphthenate, cobalt naphthenate and zinc octylate, and Lewis acids such as stannic chloride, aluminum chloride, ferric chloride, titanium chloride, zinc chloride and antimony chloride. Out of these, magnesium perchlorate and aluminum acetylacetylacetonato are particularly preferred.

An amine compound may be used as the most preferred curing catalyst in the curable composition of the present invention. When an amine compound is used as a catalyst, adhesion between a coating layer which is a cured product of the curable composition and a substrate can be greatly improved and the deterioration of the photochromic compound hardly occurs during curing.

Any known amine compound may be used as the amine compound used in the present invention if it is a basic compound which functions as an addition reaction catalyst or the above silyl compound. Examples of the amine compound which can be suitably used in the present invention include nonpolymerizable low molecular weight amine compounds such as triethanolamine, N-methyldiethanolamine, triisopropanolamine, 4,4-dimethylaminobenzophenone and diazabicyclooctane, amine compounds having a polymerizable group such as N,N-dimethylaminoethyl methacrylate and N,N-diethylaminoethyl methacrylate, and amine compounds having a silyl group such as n-(hydroxyethyl)-N-methylaminopropyltrimethoxysilane, dimethoxyphenyl-2-piperidinoethoxysilane, N,N-diethylaminomethyltrimethylsilane and (N,N-diethyl-3-aminopropyl)trimethoxysilane. Out of the above preferred amino compounds, amine compounds having a hydroxyl group, a (meth)acryloyloxy group as a radically polymerizable group, or a silyl group are preferred from the viewpoint of the improvement of adhesion.

A curing catalyst consisting a compound such as one of these amine compounds may be used alone or in combination of two or more. The amount of the curing catalyst is preferably 0.01 to 2.0 parts by weight, more preferably 0.1 to 10 parts by weight, particularly preferably 1 to 10 parts by weight based on 100 parts by weight of the total of all the radically polymerizable monomers. When the amount of the curing catalyst is smaller than 0.01 part by weight or larger than 20 parts by weight, its effect of improving adhesion between the coating layer and the substrate is hardly obtained.

Further, when the amount is larger than 20 parts by weight, the coating layer tends to yellow disadvantageously.

Out of the amine compounds, hindered amine compounds having an amino group represented by the following formula as the sole amino group do not have the above catalytic function unlike the above amine compounds.

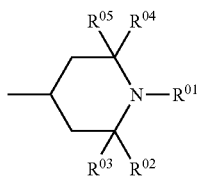

wherein $R^{01}$ is a hydrogen atom or alkyl group, and $R^{02}$, $R^{03}$, $R^{04}$ and $R^{05}$ are the same or different alkyl groups.

To the curable composition of the present invention may be added such additives as a surfactant, antioxidant, radical scavenger, ultraviolet light stabilizer, ultraviolet light absorber, release agent, color protection agent, antistatic agent, fluorescent dye, dye, pigment, perfume and plasticizer in order to improve the durability, color development rate, fading rate of the photochromic compound and moldability and to change the color of a photochromic lens to a desired color indoors (under no exposure to ultraviolet radiation). It is extremely preferred to blend a polymerization initiator which will be described hereinafter in order to cure the curable composition. Any known compounds may be used as these additives.

For instance, the surfactant may be nonionic, anionic or catiotic but preferably nonionic from the viewpoint of solubility in the polymerizable monomers and the improvement of coating film flatness when the curable composition of the present invention is used as a coating. Preferred examples of the nonionic surfactant include sorbitan fatty acid esters, glycerin fatty acid esters, decaglycerin fatty acid esters, propylene glycol.pentaerythritol fatty acid esters, polyoxyethylene sorbitan fatty acid esters, polyoxyethylene sorbitol fatty acid esters, polyoxyethylene glycerin fatty acid esters, polyethylene glycol fatty acid esters, polyoxyethylene alkyl ethers, polyoxyethylene phytosterol.phytostanol, polyoxyethylene polyoxypropylene alkyl ethers, polyoxyethylene alkylphenyl ethers, polyoxyethylene castor oil.cured castor oil, polyoxyethylene lanolin.lanolin alcohol.beeswax derivatives, polyoxyethylene alkylamine.fatty acid amides, polyoxyethylene alkylphenyl formaldehyde condensates and single-chain polyoxyethylene alkyl ethers. A silicone-based or fluorine-based surfactant is used as the surfactant which is suitably used for the cured product of the present invention. Any known surfactant having a silicone chain (polyalkylsiloxane unit) as a hydrophobic group may be used as the silicone-based surfactant and any known surfactant having a carbon fluoride chain such as an ester-based oligomer having a perfluoroalkyl group, alkylene oxide adduct having a perfluoroalkyl group or fluorine-based aliphatic polymer ester may be used as the fluorine-based surfactant.

Specific examples of the silicone-based surfactant and fluorine-based surfactant which can be suitably used in the present invention include L-7001, L-7002, L-7604 and FZ-2123 of Nippon Unicar Co., Ltd., Megafac F-470, Megafac F-1405 and Megafac. F-479 of Dainippon Ink and Chemicals, Inc., and Florad FC-430 of Sumitomo 3M Limited. The above surfactants may be used in combination of two or more. The amount of the surfactant is preferably 0.01 to 20 parts by weight based on 100 parts by weight of the total of all the radically polymerizable monomers.

As the antioxidant, radical scavenger, ultraviolet light stabilizer and ultraviolet light absorber may be suitably used hindered amine optical stabilizers, hindered phenol antioxidant, phenol-based radical scavengers, sulfur-based antioxidants, benzotriazole-based compounds and benzophenone-based compounds. These antioxidants, radical scavengers, ultraviolet light stabilizers and ultraviolet light absorbers may be used in combination of two or more. Further, the surfactant may be mixed with an antioxidant, radical scavenger, ultraviolet light stabilizer or ultraviolet light absorber when these nonpolymerizable compounds are used. The amount of the antioxidant, radical scavenger, ultraviolet light stabilizer or ultraviolet light absorber is preferably 0.001 to 20 parts by weight based on 100 parts by weight of the total of all the radically polymerizable monomers.

Out of the above stabilizers, hindered amine optical stabilizers are particularly preferred as a useful stabilizer to prevent the deterioration of the photochromic compound when the curable composition is cured and to improve the durability of its cured product when the curable composition of the present invention is used as a coating. Any known compounds may be used as the hindered amine optical stabilizers if they meet the above-mentioned definition as compounds excluded from an amine compound. Out of these, when the curable composition is used as a coating, compounds which have the effect of preventing the deterioration of the photochromic compound include bis(1,2,2,6,6-pentamethyl-4-piperidyl) sebacate, and Adecastab LA-52, LA-57, LA-62, LA-63, LA-67, LA-77, LA-82 and LA-87 of Asahi Denka Kogyo K.K. The amount of the hindered amine optical stabilizer is 0.001 to 20 parts by weight based on 100 parts by weight of the total of all the radically polymerizable monomers. When the curable composition of the present invention is used as a coating, the amount is preferably 0.1 to 10 parts by weight, more preferably 1 to 10 parts by weight.

The dye is used to develop a desired color when the photochromic compound of a photochromic lens comprising the composition of the present invention does not develop a color (when used indoors). Any known organic dye may be used if it can dissolve in the composition of the present invention uniformly. An anthraquinone-based organic dye is particularly preferred as the dye from the viewpoints of solubility in the curable composition of the present invention and the light resistance of its cured product. Preferred examples of the dye include the yellow, red and blue dyes (trade name: Diaresin) of Mitsubishi Chemical Corporation and the yellow, red and blue dyes (trade name: Kayaset) of Nippon Kayaku Co., Ltd., such as Diaresin Blue J, Diaresin Violet D, Kayaset Red 130 and Kayaset Blue FR. The amount of the dye may be suitably determined based on the amount of the photochromic compound to provide a desired color to the cured product but preferably 0.0001 to 0.1 part by weight based on 100 parts by weight of the total of all the radically polymerizable monomers. Particularly when the curable composition of the present invention is used as a coating, it is preferably used in an amount of 0.001 to 0.03 part by weight based on 100 parts by weight of the total of all the radically polymerizable monomers.

The method of preparing the curable composition of the present invention is not particularly limited. Predetermined amounts of all the components are weighed and mixed together. The order of adding the components is not particularly limited. All the components may be added at the same time, or only monomer components are pre-mixed together and then the photochromic compound and other additives are added to and mixed with the above-mixture right before polymerization. As will be described hereinafter, a polymerization initiator is preferably further added as required for polymerization.

The curable composition of the present invention has a viscosity at 25° C. of preferably 20 to 500 cp, more preferably 50 to 300 cp, particularly preferably 60 to 200 cp when it is used as a coating for optical materials which will be described hereinafter.

Within the above viscosity range, it is easy to adjust the thickness of the coating layer to a range of 10 to 100 μm and it is possible to fully develop photochromic properties.

The method of preserving the coating composition is not particularly limited. It is preferable that when the composition contains a silyl compound, silyl monomer, epoxy-based monomer and curing catalyst such as amine compound, the silyl compound, silyl monomer and epoxy-based monomer are packaged separately from the curing catalyst and mixed together before use in order to obtain high preservation stability.

The method of obtaining a photochromic cured product by curing the curable composition of the present invention is not particularly limited. A known polymerization method may be employed according to the types of the radically polymerizable monomers in use. As polymerization initiating means, use of a radical polymerization initiator such as peroxide or azo compound, application of ultraviolet radiation, α-ray, β-ray or γ-ray, or combination of them can be applied.

Any known radical polymerization initiator may be used. Typical examples of the radical polymerization initiator as the thermal polymerization initiator include diacyl peroxides such as benzoyl peroxide, p-chlorobenzoyl peroxide, decanoyl peroxide, lauroyl peroxide and acetyl peroxide; peroxy esters such as t-butyl peroxy-2-ethyl hexanoate, t-butyl peroxydicarbonate, cumyl peroxyneodecanate and t-butyl peroxybenzoate; percarbonates such as diisopropyl peroxydicarbonate, di-2-ethylhexyl peroxydicarbonate and di-sec-butyloxycarbonate; and azo compounds such as 2,2'-azobisisobutyronitrile, 2,2'-azobis(4-dimethylvaleronitrile), 2,2'-azobis(2-methylbutyronitrile) and 1,1'-azobis(cyclohexane-1-carbonitrile).

The amount of the thermal polymerization initiator which differs according to polymerization conditions, the type of the initiator and the types and ratio of the polymerizable monomers and cannot be limited unconditionally, is preferably 0.01 to 10 parts by weight based on 100 parts by weight of the total of all the polymerizable monomers. The above thermal polymerization initiators may be used alone or in combination of two or more.

To polymerize the curable composition of the present invention by exposure to ultraviolet radiation, a photopolymerization initiator such as benzoin, benzoin methyl ether, benzoin butyl ether, benzophenol, acetophenone, 4,4'-dichlorobenzophenone, diethoxyacetophenone, 2-hydroxy-2-methyl-1-phenylpropan-1-one, benzylmethyl ketal, 1-(4-isopropylphenyl)-2-hydroxy-2-methylpropan-1-one, 1-hydroxycyclohexylphenyl ketone, 2-isopropylthioxanthone, bis(2,6-dimethoxybenzoyl-2,4,4-trimethyl-pentylphosphine oxide, bis(2,4,6-trimethylbenzoyl)-phenylphosphine oxide, 2,4,6-trimethylbenzoyldiphenylphosphine oxide or 2-benzyl-2-dimethylamino-1-(4-morpholinophenyl)-butanone −1 is preferably used.

The photopolymerization initiator is preferably used in an amount of 0.001 to 5 parts by weight based on 100 parts by weight of the total of all the radically polymerizable monomers. The above photopolymerization initiators may be used alone or in combination of two or more. The above thermal polymerization initiator may be used in conjunction with the photopolymerization initiator.

When the composition of the present invention is used as a coating, the photopolymerization initiator is preferably used in an amount of 0.01 to 1 part by weight based on 100 parts by weight of the total of all the radically polymerizable monomers from the viewpoint of the durability of the cured product.

Particularly preferably, the curable composition of the present invention comprising the above photopolymerization initiator is cured by exposure to ultraviolet radiation and then heated to complete its polymerization. The heating temperature may be suitably determined according to the silyl compound in use. When the curable composition of the present invention is heated at a temperature of 110 to 130° C. for 1 to 3 hours, sufficiently high adhesion to the substrate can be obtained.

To polymerize the curable composition of the present invention through exposure to ultraviolet radiation, any known light source may be used. Examples of the light source include super high-pressure mercury lamp, high-pressure mercury lamp, low-pressure mercury lamp, xenon lamp, carbon arc, bactericidal lamp, metal halide lamp and electrodeless lamp. The time of exposure using the light source may be suitably determined according to the type, absorption wavelength and sensitivity of the photopolymerization initiator and the thickness of the photochromic layer. When an electron beam is used as a light source, the photochromic layer can be cured without adding a photopolymerization initiator.

Although the curable composition of the present invention is cured by using the above polymerization initiator to be used as a photochromic material by itself, it is particularly preferably used as a coating for a substrate, for example, an optical substrate, preferably an optical material such as a spectacle lens.

The optical material is not particularly limited and may be a known optical material such as spectacle lens, or house or car window glass.

The spectacle lens is a known spectacle lens made of plastic such as (meth)acrylic resin, polycarbonate resin, allyl resin, thiourethane resin, urethane resin or thioepoxy resin, or glass spectacle lens. When the curable composition of the present invention is used as a coating for spectacle lenses, it may be used for any type of spectacle lenses, preferably plastic spectacle lenses, more preferably (meth)acrylic resin-based polycarbonate resin, allyl resin, thiourethane resin, urethane resin and thioepoxy resin spectacle lenses.

When the curable composition of the present invention is used as a coating for optical materials such as spectacle lenses, it is preferably applied to an optical material by spin coating, spray coating, dip coating or dip-spin coating and then cured by exposure to light or by heating. More preferably, after it is cured by exposure to light, it is further heated to complete its polymerization. When the substrate is to be coated with the curable composition, it is preferably subjected to a pre-treatment which will be described hereinafter.

When the curable composition of the present invention is used as a coating, it is applied to the surface of the above substrate to form a coating layer which is then polymerized and cured to form a photochromic film. Prior to application, the substrate is preferably pre-treated to improve the applicability and adhesion of the above photopolymerizable and curable composition to the substrate.

The pre-treatment is a chemical treatment with a basic aqueous solution or acid aqueous solution, polishing with an abrasive, plasma treatment with atmospheric plasma or low-pressure plasma, corona discharge treatment or UV ozone treatment. Any known methods may be used to carry out the above pre-treatments and may be combined to improve the adhesion of the substrate. Out of the above pre-treatments, a chemical treatment with a basic aqueous solution is preferred as a pre-treatment for the above-described spectacle lens substrate because it is easily used. When the curable composition of the present invention is used, the above chemical treatment can provide strong adhesion to the substrate. As for the above treatment, the substrate is generally impregnated with an alkali aqueous solution which is a sodium hydroxide aqueous solution or potassium hydroxide aqueous solution. The concentration of the hydroxide is preferably 5 to 30 wt %. The treatment temperature which is suitably determined in consideration of the heat resistance of the substrate in use, is preferably 20 to 60° C. The treatment is carried out by immersing the substrate in an alkali solution or by ultrasonically rinsing the substrate while it is immersed in the alkali solution. The treatment time which differs according to the treatment conditions, is preferably 1 minute to 1 hour, more preferably 5 to 15 minutes. The alkali solution may be a mixed solution of water and an alcohol solvent or alcohol solution besides an aqueous solution. The used alcohol may be a lower alcohol such as methanol, ethanol or isopropyl alcohol and a small amount of an organic base such as 1-methyl-2-pyrrolidone as an additive may be added in an amount of 1 to 10 parts by weight based on 100 parts by weight of the alkali solution. After an alkali treatment, the substrate may be rinsed with water such as pure water, ion exchange water or distilled water and dried.

The thickness of the coating layer obtained by curing with the above method is not particularly limited but preferably relatively large so as to obtain excellent photochromic properties such as high color development density and durability even when the concentration of the photochromic compound is low. However, since the initial yellowness increases as the coating layer becomes thicker, the coating layer is preferably as thick as 10 to 100 µm, more preferably 20 to 50 µm. To obtain easily this thick coating layer, the viscosity at 25° C. of the curable composition is adjusted to preferably 20 to 500 cp, more preferably 50 to 300 cp, much more preferably 60 to 200 cp. Conventionally known coating compositions contain a solvent to obtain a uniform film and generally have a viscosity of 5 cp or less, and coating layers obtained therefrom are as thin as several µm or less.

To use the curable composition of the present invention as a coating material for spectacle lenses, the amount of each component, particularly the ratio of the radically polymerizable monomers is preferably adjusted so that the refractive index of its cured product becomes almost equal to the refractive index of a spectacle lens. In general, the refractive index of the cured product is adjusted to about 1.48 to 1.75.

Because the curable composition of the present invention contains a silyl compound, the composition exhibits extremely high adhesion to an optical material when it is used as a coating material for optical materials such as spectacle lenses, particularly plastic spectacle lenses.

Although the thus coated optical material can be used as a photochromic optical material as it is, it is preferably coated with a hard coating material. When it is coated with the hard coating material, the abrasion resistance of the photochromic optical material can be improved.

Any known hard coating material may be used. For example, a hard coating containing a silane coupling agent and a sol of a metal oxide such as silicon, zirconium, antimony or aluminum oxide as essential components or a hard coating containing an organic polymer as an essential component may be used.

The curable composition of the present invention is extremely useful because it has high adhesion to a hard coat which is cured by the condensation method and has been difficult to be used with conventionally known compositions due to low adhesion.

Further, secondary treatment such as an anti-reflection treatment or antistatic treatment can be made on the surface, wherein said surface is the surface of a cured product of the composition of the present invention alone or the hard-coated or naked surface of the coating layer formed by using the coating of the present invention, by the deposition of a thin film of a metal oxide such as $SiO_2$, $TiO_2$ or $ZrO_2$ or the application of an organic polymer thin film.

EXAMPLES

The following examples are provided for the purpose of further illustrating the present invention but are in no way to be taken as limiting. The abbreviations and names of the compounds used are given below.

(1) Radically Polymerizable Monomers

TMPT: trimethylolpropane trimethacrylate

DPEHA: dipentaerythritol hexaacrylate

U6A: urethane oligomer hexaacrylate (Shin Nakamura Kagaku Co., Ltd.: U-6HA)

EB6A: polyester oligomer hexaacrylate (Daicel UCB Co., Ltd.: EB1830)

GMA: glycidyl methacrylate (epoxy-based monomer)

BPE: 2,2-bis(4-methacryloyloxyethoxyphenyl)propane

9GA: polyethylene glycol diacrylate having an average molecular weight of 532

MePEGMA: methyl ether polyethylene glycol methacrylate having an average molecular weight of 1,000

BPE oligo: 2,2-bis(4-acryloyloxypolyethylene glycol phenyl)propane having an average molecular weight of 776

BPPEMA: 2,2-bis(4-methacryloyloxypolyethylene glycol phenyl)propane having an average molecular weight of 804

TMSiMA: γ-methacryloyloxypropyl trimethoxysilane (silyl monomer)

(2) Silyl Compounds

GTSi: γ-glycidoxypropyltrimethoxysilane

ADSi: γ-aminopropylmethyldiethoxysilane (3) Amine Compounds

NMDEA: N-methyldiethanolamine

DMEMA: N,N-dimethylaminoethyl methacrylate (4) Photochromic Compounds

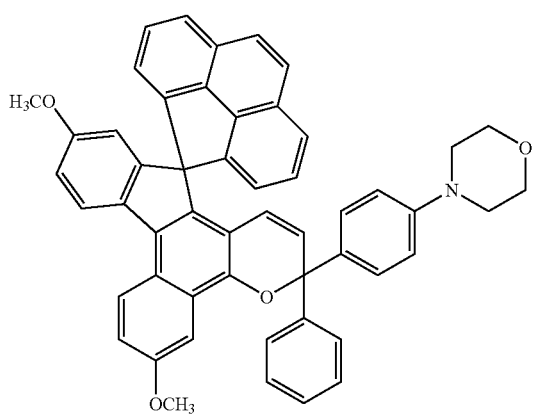

chromene 1

-continued chromene 2
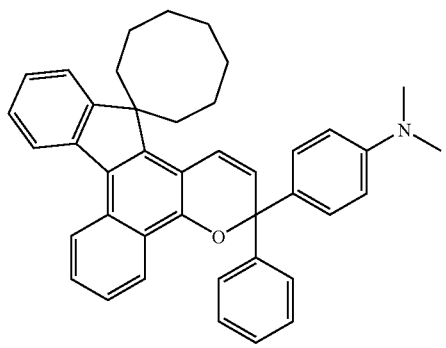

chromene 3
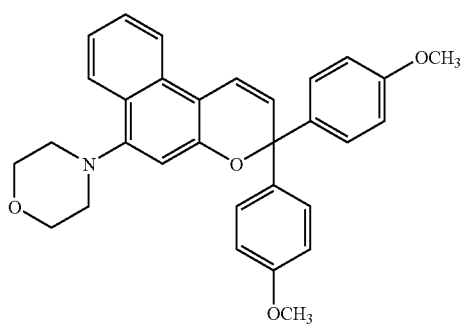

chromene 4
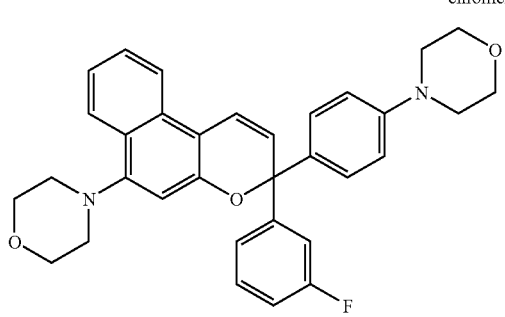

chromene 5
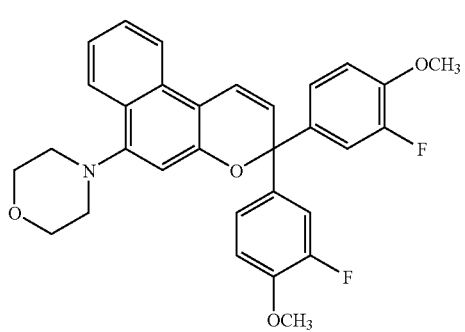

(5) Polymerization Initiators
CGI1800: mixture of 1-hydroxycyclohexylphenyl ketone and bis(2,6-dimethoxybenzoyl)-2,4,4-trimethyl-pentylphosphine oxide (weight ratio: 3:1)
CGI1870: mixture of 1-hydroxycyclohexylphenyl ketone and bis(2,6-dimethoxybenzoyl)-2,4,4-trimethyl-pentylphosphine oxide (weight ratio: 3:7)
CGI819: bis(2,4,6-trimethylbenzoyl)-phenylphosphine oxide (6) Hard Coating Solution
TS56H (condensed hard coating of Tokuyama Corporation)

(7) Stabilizers
LS765: bis(1,2,2,6,6-pentamethyl-4-piperidyl)sebacate
LA-67: mixture of 1,2,3,4-butanetetracarboxylic acid, 2,2,6,6-tetramethyl-4-piperidinyl ester and tridecyltetra ester (manufactured by Asahi Denka Kogyo K.K.)

(8) Optical Materials (Substrates)
CR39 (allyl resin plastic lens; refractive index=1.50)
MR (thiourethane-based resin plastic lens; refractive index=1.60)
TE (thioepoxy-based resin plastic lens; refractive index=1.71)
PC-(polycarbonate resin plastic lens; refractive index=1.59)
SPL (methacrylic resin plastic lens; refractive index=1.54)
PX (urethane-based resin plastic lens; refractive index=1.53)

(9) Surfactants
L-7001: L-7001 of Nippon Unicar Co., Ltd.
F-470: Megafac F-470 of Dainippon Ink and Chemicals, Inc.

(10) Dyes
Blue J: Diaresin Blue J of Mitsubishi Chemical Corporation.
Violet D: Diaresin Violet D of Mitsubishi Chemical Corporation.

Example 1

5 parts of γ-glycidoxypropyltrimethoxysilane as a silane coupling agent, 3 parts of chromene 1 as a photochromic compound, 5 parts of N-methyldiethanolamine as an amine compound, 5 parts of LS765 as a stabilizer and 0.5 part of CGI1800 as a polymerization initiator were added to 100 parts by weight of polymerizable monomers consisting of 20 parts by weight of trimethylolpropane trimethacrylate, 40 parts by weight of 2,2-bis(4-methacryloyloxyethoxyphenyl)propane, 10 parts by weight of urethane oligomer hexaacrylate, 20 parts by weight of polyethylene glycol diacrylate having an, average molecular weight of 532 and 10 parts by weight of glycidyl methacrylate and fully mixed with these. The amounts (parts) of the silane coupling agent, amine compound, polymerization initiator, stabilizer and photochromic compound are amounts (parts by weight) based on 100 parts by weight of the total of all the radically polymerizable monomers. The kinetic viscosity of this resulting mixed solution was measured with a Cannon-Fenske viscometer. The measurement was made at 25° C. in accordance with JISK2283. When the viscosity of the specimen was calculated based on the following equation by using the obtained kinetic viscosity and the measured specific gravity of the specimen, it was 83 dp.

"viscosity(cp)=kinetic viscosity(cse)×specific gravity (g/cm$^3$)"

About 2 g of the mixed solution obtained by the above method was applied to the surface of a 2 mm-thick plastic lens (MR) with the 1H-DX2 spin coater of MIKASA Co., Ltd. at a revolution of 60 r.p.m. for 40 seconds, 500 r.p.m. for 2 seconds and 1,000 r.p.m. for 5 seconds. This coating layer of the lens surface was cured by 150 seconds of exposure with a metal halide lamp having an output of 100 mW/cm$^2$ in a nitrogen gas atmosphere. Further, it was heated at 120° C. for 1 hour. The plastic lens used was immersed in an NaOH solution (10% aqueous solution) at 60° C. for 6 minutes, fully rinsed and dried with air again to modify its surface state in advance.

The obtained lens having a photochromic coating layer was used as a specimen to measure the maximum absorption wavelength, color development density, fading half-life period, durability and adhesion between the lens and the photochromic coating layer of the specimen.

(1) thickness of photochromic coating layer: Measured with the thin film measuring instrument of Filmetrics Co., Ltd.

(2) maximum absorption wavelength (λmax): The obtained lens having a photochromic coating layer was exposed to light from the L-2480 (300W) SHL-100 xenon lamp of Hamamatsu Photonics Co., Ltd. through an aeromass filter (of Corning Co., Ltd.) at 20° C.±1° C. and a beam intensity on the surface of a polymer of 2.4 mW/cm$^2$ at 365 nm and 24 μW/cm$^2$ at 245 nm for 120 seconds to develop a color, and the maximum absorption wavelength of the lens was measured with the spectrophotometer (MCPD1000 instantaneous multi-channel photodetector) of Ohtsuka Denshi Kogyo Co., Ltd. The maximum absorption wavelength is connected with the tone of a developed color.

(3) Color development density: The difference {ϵ(120)−ϵ(0)} between absorbance at the maximum absorption wavelength {ϵ(120)} after 120 seconds of exposure and absorbance at the wavelength of a cured product without exposure {ϵ(0)} was obtained and taken as color development density. As this value becomes larger, the photochromism becomes better.

(4) Fading half-life period: After 120 seconds of exposure, exposure was stopped to measure the time {t½ (min)} required until the absorbance at the maximum wavelength of the cured product lowered to ½ of {ϵ(120)−ϵ(0)}. As this period becomes shorter, the fading rate becomes faster and photochromism becomes better.

(5) Durability: The following accelerated deterioration test was carried out to evaluate the durability of color development by exposure. That is, the obtained lens having a photochromic coating layer was subjected to 200 hours of the accelerated deterioration test with the X25 xenon weather meter of Suga Shikenki Co., Ltd. Thereafter, the evaluation of color development density was carried out before and after the test to measure color development density (A0) before the test and color development density (A200) after the test. The value {(A200/A0)×100} after the test was taken as the residual rate (%) and considered as an index of color development durability. As the residual rate becomes higher, the color development durability improves.

(6) Adhesion between lens and photochromic coating layer (adhesion 1): The coating layer side surface of the lens having a photochromic coating layer was cross-cut with a knife having a sharp end to form one hundred 1 mm×1 mm squares in accordance with the JIS K5400 cross-cut adhesion test method. Subsequently, commercially available Cellophane tape was affixed to the surface and removed quickly to observe the separation of the coating layer (coating film) visually. When all the squares did not come off, adhesion was evaluated as ○, when some of the squares came off, it was evaluated as Δ, and when all the squares came off, it was evaluated as X.

After the lens having a photochromic coating layer obtained by the above method was rinsed with acetone and fully dried with air to be made clean, it was immersed in a 10% NaOH aqueous solution for 10 minutes, fully rinsed with water and dried with air again. This lens was immersed in the TS56H hard coating solution, pulled up at 30 mm/min, pre-dried at 60° C. for 15 minutes and heated at 130° C. for 2 hours to be cured so as to prepare a specimen having a hard coating layer. This specimen was evaluated for adhesion between the photochromic coating layer and the hard coating material, abrasion resistance and the dissolution of the photochromic compound into the hard coating layer.

(7) Adhesion between photochromic coating layer and hard coating material (adhesion 2): The photochromic coating layer side surface (covered with a hard coating layer) of the lens having a hard coating layer was cross-cut with a knife having a sharp end to form one hundred 1 mm×1 mm squares in accordance with JIS K5400 cross-cut adhesion test method. Subsequently, commercially available Cellophane tape was affixed to the surface and removed quickly to observe the separation of the hard coating layer and the photochromic coating layer visually. When all the squares did not come off, adhesion was evaluated as ○, when some of the squares came off, it was evaluated as Δ, and when all the squares came off, it was evaluated as X.

As for the above evaluation results, the thickness of the photochromic coating layer was 33 μm, λmax was 610 nm, the color development density was 0.82, the fading half-life period was 1.2 minutes, the durability was 43%, adhesion between the coating layer and the substrate (adhesion 1) was ○, and adhesion between the coating layer and the hard coating material (adhesion 2) was ○.

Examples 2 to 10

Cured products having a cured photochromic coating layer of the curable composition of the present invention were obtained in the same manner as in Example 1 except that the radically polymerizable monomers, chromene compound and other additives shown in Table 1 were used to evaluate their characteristic properties. The amounts (parts by weight) of the silane coupling agent, amine compound, polymerization initiator, stabilizer and photochromic compound in the following tables were based on 100 parts by weight of the total of all the radically polymerizable monomers.

TABLE 1

| Example No. | Silyl Compound (parts) | Radically Polymerizable Monomers (parts by weight) |
| --- | --- | --- |
| 1 | GTSi 5 | TMPT/BPE/U6A/9GA/GMA 20/40/10/20/10 |
| 2 | GTSi 7 | TMPT/BPE oligo/EB6A/9GA/GMA 15/50/10/15/10 |
| 3 | GTSi 3 | DPEHA/BPE/U6A/MePEGMA/GMA 20/40/10/20/10 |
| 4 | ADSi 5 | TMPT/BPE oligo/EB6A/GMA 30/50/10/10 |
| 5 | ADSi 5 | TMPT/BPE/U6A/9GA/GMA 20/30/25/15/10 |
| 6 | GTSi 10 | TMPT/BPE/U6A/MePEGMA/GMA 15/30/25/20/10 |
| 7 | GTSi 5 | DPEHA/BPE oligo/EB6A/9GA/GMA 20/30/15/20/15 |
| 8 | ADSi 7 | TMPT/BPE oligo/EB6A/9GA/GMA 20/40/10/20/10 |
| 9 | GTSi 5 | TMPT/BPE oligo/U6A/9GA/GMA 15/40/10/20/15 |
| 10 | ADSi 5 | DPEHA/BPE oligo/EB6A/9GA/GMA 20/40/10/15/15 |

| Example No. | Amine Compound (parts) | Polymerization Initiator (parts) | Stabilizer (parts) | Photochromic Compound (parts) | Viscosity at 25° C. (cp) |
| --- | --- | --- | --- | --- | --- |
| 1 | NMDEA 5 | CGI1800 0.5 | LS765 5 | Chromene 1 3 | 83 |

TABLE 1-continued

| | | | | | |
|---|---|---|---|---|---|
| 2 | NMDEA 5 | CGI1800 0.5 | LS765 5 | Chromene 1 3 | 130 |
| 3 | DMEMA 5 | CGI1800 0.5 | LS765 5 | Chromene 1 3 | 90 |
| 4 | NMDEA 5 | CGI1800 0.5 | LS765 5 | Chromene 1 3 | 105 |
| 5 | NMDEA 5 | CGI1800 0.5 | LS765 5 | Chromene 2 3 | 140 |
| 6 | DMEMA 5 | CGI1800 0.5 | LS765 5 | Chromene 2 3 | 148 |
| 7 | NMDEA 5 | CGI1800 0.5 | LS765 5 | Chromene 3 3 | 133 |
| 8 | DMEMA 5 | CGI1800 0.5 | LS765 5 | Chromene 3 3 | 90 |
| 9 | NMDEA 5 | CGI1800 0.5 | LS765 5 | Chromene 4 3 | 78 |
| 10 | NMDEA 5 | CGI1800 0.5 | LS765 5 | Chromene 4 3 | 90 |

The results are shown in Table 2.

TABLE 2

| Example No. | λmax (nm) | Color Development Density (abs.) | Fading Half-life Period (min.) | Durability (5) | Adhesion 1 (substrate) | Film Thickness (μm) | Adhesion 2 (hard coat) |
|---|---|---|---|---|---|---|---|
| 1 | 610 | 0.82 | 1.2 | 43 | ○ | 33 | ○ |
| 2 | 610 | 0.81 | 1.1 | 47 | ○ | 43 | ○ |
| 3 | 610 | 0.79 | 1.3 | 44 | ○ | 35 | ○ |
| 4 | 610 | 0.84 | 1.1 | 46 | ○ | 38 | ○ |
| 5 | 588 | 0.98 | 1.6 | 65 | ○ | 50 | ○ |
| 6 | 590 | 1.05 | 1.7 | 60 | ○ | 45 | ○ |
| 7 | 460 | 0.71 | 1.8 | 45 | ○ | 44 | ○ |
| 8 | 462 | 0.73 | 1.7 | 40 | ○ | 35 | ○ |
| 9 | 474 | 0.85 | 1.8 | 35 | ○ | 30 | ○ |
| 10 | 474 | 0.83 | 1.7 | 36 | ○ | 33 | ○ |

Comparative Example 1 to 4

For comparison, photochromic cured products were obtained in the same manner as in Example 1 except that polymerizable monomers and chromene compound shown in Table 3 were used to evaluate their characteristic properties.

TABLE 3

| Comparative Example No. | Silyl Compound (parts) | Radically Polymerizable Monomers (parts by weight) |
|---|---|---|
| 1 | — | TMPT/BPE/U6A/9GA/GMA 20/40/10/20/10 |
| 2 | — | TMPT/BPE/U6A/9GA/GMA 20/40/10/20/10 |
| 3 | — | TMPT/BPE/U6A/9GA/GMA 20/40/10/20/10 |
| 4 | — | TMPT/BPE/U6A/9GA/GMA/TMSiMA 20/35/10/20/10/5 |

| Comparative Example No. | Amine Compound (parts) | Polymerization Initiator (parts) | Stabilizer (parts) | Photochromic Compound (parts) | Viscosity at 25° C. (cp) |
|---|---|---|---|---|---|
| 1 | NMDEA 5 | CGI1800 0.5 | LS765 5 | Chromene 1 3 | 85 |
| 2 | NMDEA 15 | CGI1800 0.5 | LS765 5 | Chromene 1 3 | 70 |
| 3 | DMEMA 5 | CGI1800 0.5 | LS765 5 | Chromene 1 3 | 83 |
| 4 | NMDEA 5 | CGI1800 0.5 | LS765 5 | Chromene 1 3 | 80 |

The results are shown in Table 4.

TABLE 4

| Comparative Example No. | λmax (nm) | Color Development Density (abs.) | Fading Half-life Period (min.) | Durability (%) | Adhesion 1 (substrate) | Film Thickness (μm) | Adhesion 2 (hard coat) |
|---|---|---|---|---|---|---|---|
| 1 | 610 | 0.82 | 1.3 | 36 | X | 35 | X |
| 2 | 610 | 0.78 | 1.1 | 25 | Δ | 30 | X |
| 3 | 610 | 0.81 | 1.5 | 37 | X | 33 | X |
| 4 | 610 | 0.77 | 0.9 | 29 | X | 35 | ○ |

As obvious from Table 1 and Table 2, the curable composition of the present invention comprising a silyl compound had excellent adhesion to the substrate (lens) and hard coating material.

Meanwhile, as shown in Table 3 and Table 4, in Comparative Examples 1 to 4 in which no silyl compound was contained, adhesion to the substrate (lens) was extremely low and adhesion to the hard coating material was extremely low except Comparative Example 4 in which a silyl monomer was used.

Examples 11 to 14

Specimens were prepared in the same manner as in Example 1 except that a plastic lens shown in Table 5 was used in place of MR which is a thiourethane-based resin plastic lens as an optical substrate and the composition of the coating was changed as shown below to evaluate their characteristic properties. The viscosity of the coating solution was 130 cp. The results are shown in Table 5.
Radically polymerizable monomers (parts by weight):
  TMPT/BPE oligo/EB6A/9GA/GMA=15/50/10/15/10
Silyl compound (parts): GTSi=5
Amine compound (parts): NMDEA=5
Polymerization initiator (parts): CGI1800=0.5
Stabilizer (parts): LS765=5
Photochromic compounds (parts): chromene 2/chromene 3/chromene 4=2.3/1.5/1.5

TABLE 5

| Example No. | Substrate | λmax (nm) | Color Development Density (abs.) | Fading Half-life Period (min.) | Durability (%) | Adhesion 1 (substrate) | Film Thickness (μm) | Adhesion 2 (hard coat) |
|---|---|---|---|---|---|---|---|---|
| 11 | CR39 | 590 | 0.92 | 1.7 | 53 | ○ | 40 | ○ |
| 12 | TE | 588 | 0.88 | 1.7 | 55 | ○ | 43 | ○ |
| 13 | PC | 592 | 0.88 | 1.8 | 56 | ○ | 42 | ○ |
| 14 | SPL | 592 | 0.92 | 1.6 | 53 | ○ | 41 | ○ |

As shown in Table 5, the curable composition of the present invention shows excellent adhesion to any type of substrate and is excellent in other physical properties.

Examples 15 to 20

Cured products having a cured photochromic coating layer of the curable composition of the present invention were obtained in the same manner as in Example 1 except that the silyl compound, radically polymerizable monomers and other additives shown in Table 6 were used and the mixture of chromene 2, chromene 3, chromene 4 and chromene 5 was used as a photochromic compound in an amount of 2.35 parts, 1.5 parts, 0.2 part and 0.3 part based on 100 parts by weight of the total of all the radically polymerizable monomers, respectively, to evaluate their characteristic properties as in the same manner as in Example 1. The results are shown in Table 7.

TABLE 6

| Example No. | Substrate | Silyl Compound (parts) | Radically Polymerizable Monomers (parts by weight) |
|---|---|---|---|
| 15 | MR | GTSi 5 | TMPT/BPPEMA/EB6A/9GA/GMA 15/50/10/15/10 |
| 16 | PX | GTSi 10 | TMPT/BPPEMA/EB6A/9GA/GMA 20/40/10/20/10 |
| 17 | PX | GTSi 10 | TMPT/BPPEMA/EB6A/9GA/GMA/TMSiMA 15/45/10/15/10/5 |
| 18 | TE | GTSi 5 | TMPT/BPPEMA/EB6A/9GA/GMA/TMSiMA 15/45/10/15/10/5 |
| 19 | CR39 | GTSi 5 | TMPT/BPPEMA/EB6A/9GA/GMA/TMSiMA 15/45/10/15/10/5 |
| 20 | PX | GTSi 10 | DPEHA/BPE oligo/EB6A/9GA/GMA/TMSiMA 20/30/10/15/15/10 |

| Example No. | Amine Compound (parts) | Polymerization Initiator (parts) | Stabilizer (parts) | Surfactant (parts) | Dye (parts) | Viscosity at 25° C. (cp) |
|---|---|---|---|---|---|---|
| 15 | NMDEA 1 | CGI1800 0.5 | LS765 5 | L-7001 0.1 | Blue J 0.02 | 127 |
| 16 | NMDEA 4 | CGI1870 0.5 | LA-67 5 | L-7001 0.1 | Violet D 0.02 | 88 |
| 17 | NMDEA 4 | CGI819 0.4 | LA-67 5 | F-470 0.05 | Blue J 0.02 | 105 |
| 18 | NMDEA 2 | CGI1800 0.5 | LS765 5 | L-7001 0.1 | Blue J 0.02 | 115 |
| 19 | NMDEA 2 | CGI1800 0.5 | LS765 5 | L-7001 0.1 | Blue J 0.02 | 115 |
| 20 | NMDEA 5 | CGI1800 0.5 | LS765 5 | L-7.001 0.1 | Blue J 0.02 | 80 |

TABLE 7

| Example No. | λmax (nm) | Color Development Density (abs.) | Fading Half-life Period (min.) | Durability (%) | Adhesion 1 (substrate) | Film Thickness (μm) | Adhesion 2 (hard coat) |
|---|---|---|---|---|---|---|---|
| 15 | 588 | 1.04 | 1.8 | 56 | ○ | 33 | ○ |
| 16 | 588 | 0.98 | 1.9 | 56 | ○ | 35 | ○ |
| 17 | 586 | 1.15 | 1.7 | 64 | ○ | 40 | ○ |
| 18 | 588 | 1.18 | 1.6 | 62 | ○ | 38 | ○ |
| 19 | 590 | 1.23 | 1.6 | 70 | ○ | 50 | ○ |
| 20 | 588 | 1.02 | 1.5 | 58 | ○ | 33 | ○ |

As described above, by using the curable composition of the present invention, a photochromic cured product having excellent photochromic properties such as high color development density and fast fading rate and excellent adhesion between a photochromic coating layer and a substrate can be obtained.

Since the photochromic cured product of the present invention has the above excellent features, it is extremely useful as an optical material such as a photochromic lens material.

The invention claimed is:

1. A curable composition consisting of: (1) 0.1 to 20 parts by weight of a silicon compound having a silanol group or a functional group capable of forming a silanol group upon hydrolysis and no radically polymerizable group, (2) 100 parts by weight of a radically polymerizable monomer having a polymerizable group selected from the group consisting of (meth)acryloyl group, (meth)acryloyloxy group, (meth)acryloylamino group, (meth)acryloylthio group, vinyl group, allyl group and styryl group, (3) 0.01 to 20 parts by weight of a photochromic compound, and (4) at least one optional component selected from the group consisting of a radical polymerization initiator, a curing catalyst for the silicon compound, a surfactant, an antioxidant, a radical scavenger, an ultraviolet light stabilizer, an ultraviolet light absorber, a release agent, a color protection agent, an antistatic agent, a fluorescent dye, a dye, a pigment, a perfume and a plasticizer,
wherein the radically polymerizable monomer includes a radically polymerizable monomer having an epoxy group in the molecule.

2. The curable composition according to claim 1, wherein the radically polymerizable monomer further includes a radically polymerizable monomer having a silanol group or a group capable of forming a silanol group upon hydrolysis.

3. A coating which comprises the curable composition of claim 1 or 2.

4. An optical article having photochromism comprising a cured layer of the curable composition of claim 1 or 2 formed on at least one side of an optical substrate.

5. A photochromic cured product obtained by curing the curable composition of claim 1 or 2.

* * * * *